United States Patent
Jain (10) Patent No.: US 11,494,234 B2
(45) Date of Patent: Nov. 8, 2022

(54) MULTI-LANGUAGE STATEFUL SERVERLESS WORKLOADS

(71) Applicant: SAP SE, Walldorf (DE)

(72) Inventor: Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 398 days.

(21) Appl. No.: 16/738,299

(22) Filed: Jan. 9, 2020

(65) Prior Publication Data
US 2021/0216369 A1 Jul. 15, 2021

(51) Int. Cl.
G06F 9/46 (2006.01)
G06F 9/50 (2006.01)
G06F 3/06 (2006.01)
H04L 67/10 (2022.01)

(52) U.S. Cl.
CPC .......... *G06F 9/5005* (2013.01); *G06F 3/0604* (2013.01); *G06F 3/067* (2013.01); *G06F 3/0655* (2013.01); *H04L 67/10* (2013.01)

(58) Field of Classification Search
CPC ........ G06F 9/5005; G06F 9/46; G06F 9/5027; G06F 9/5088; G06F 9/5094; G06F 2009/502; G06F 2009/509; G06N 5/043; G06N 7/005
See application file for complete search history.

(56) References Cited

U.S. PATENT DOCUMENTS 10,649,861 B1 * 5/2020 Natanzon ............. H04L 41/5025
10,990,369 B2 * 4/2021 Natanzon ................. G06F 8/60

OTHER PUBLICATIONS

Sharma, Linux Networking, Tracing and IO Visor, a New System Performance Tool for a Distributed World, The New Stack, Sep. 2015, 17 pages.*

* cited by examiner

*Primary Examiner* — Diem K Cao
(74) *Attorney, Agent, or Firm* — Buckley, Maschoff & Talwalkar LLC (57) ABSTRACT

Some embodiments may be associated with a cloud computing environment. A serverless runtime workload may execute an eBPF program via a kprobe which gets invoked when function code is executed as a Linux process. The system may determine, by the kprobe function associated with an identifier, that an orchestrator is evicting the serverless runtime workload. Responsive to the determination, a userspace program may be invoked via the eBPF in tandem with the kprobe acting as an interception mechanism. The system may then capture the current workload process state data associated with the serverless runtime workload based on the identifier. A clustered memory-based storage component may store the captured current workload process state data in association with the identifier. A subsequent serverless runtime workload may determine that the orchestrator is restoring the serverless runtime workload. Responsive to the determination, the system may load the workload process state data from the clustered memory-based storage component.

20 Claims, 10 Drawing Sheets

MULTI-LANGUAGE STATEFUL SERVERLESS WORKLOADS

BACKGROUND

In many cases, an enterprise may execute applications via virtual machines in a cloud-based computing environment. Moreover, "serverless" computing is a cloud-computing execution model in which the cloud provider runs a server and dynamically manages the allocation of machine resources (e.g., via an orchestrator). Typically, serverless workloads are implemented in a stateless fashion. For example, if a workload has an internal counter that is periodically incremented, the current value of the counter is not maintained when the workload is evicted and then later restored by the orchestrator. Not all problems, however, are stateless in nature. In fact, the majority of workloads need state (e.g., a shopping cart application or a Hyper-Text Transfer Protocol ("HTTP") session), and, as a result, stateful serverless solutions have emerged (sometimes referred to as "serverless 2.0" implementations). The stateful version of serverless captures state when a function is evicted, and the state is brought back in as the same function is brought back in (e.g., is restored). The current approach is done using the Akka software runtime language and toolkit (and the solution is restricted to Akka). Since the majority of serverless workloads are written in other languages (e.g., nodejs, python, etc.), an Akka-only implementation may not be sufficient.

It would therefore be desirable to provide for multi-language stateful serverless workloads in a cloud computing environment in an efficient, automatic, and accurate manner.

SUMMARY

Methods and systems may be associated with a cloud computing environment. A serverless runtime workload may execute an extended Berkley Packet Filter ("eBPF") program via a kprobe which gets invoked when function code is executed as a Linux process. The system may determine, by the kprobe function associated with an identifier, that an orchestrator is evicting the serverless runtime workload. Responsive to the determination, a userspace program may be invoked via the eBPF in tandem with the kprobe acting as an interception mechanism. The system may then capture current workload process state data associated with the serverless runtime workload based on the identifier. A clustered memory-based storage component may store the captured current workload process state data in association with the identifier. A subsequent serverless runtime workload may determine that the orchestrator is restoring the serverless runtime workload. Responsive to the determination, the system may load the workload process state data from the clustered memory-based storage component.

Some embodiments comprise: means for determining, by and eBPF which is executed via a kprobe of a serverless runtime workload function associated with an identifier, that an orchestrator is evicting a serverless runtime workload; responsive to the determination, means for invoking a userspace program via the eBPF in tandem with the kprobe acting as an interception mechanism; means for capturing current workload process state data associated with the serverless runtime workload based on the identifier; and means for storing the captured current workload process state data in a clustered memory-based storage component in association with the identifier.

Some technical advantages of some embodiments disclosed herein are improved systems and methods to provide for multi-language stateful serverless workloads in a cloud computing environment in an efficient, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
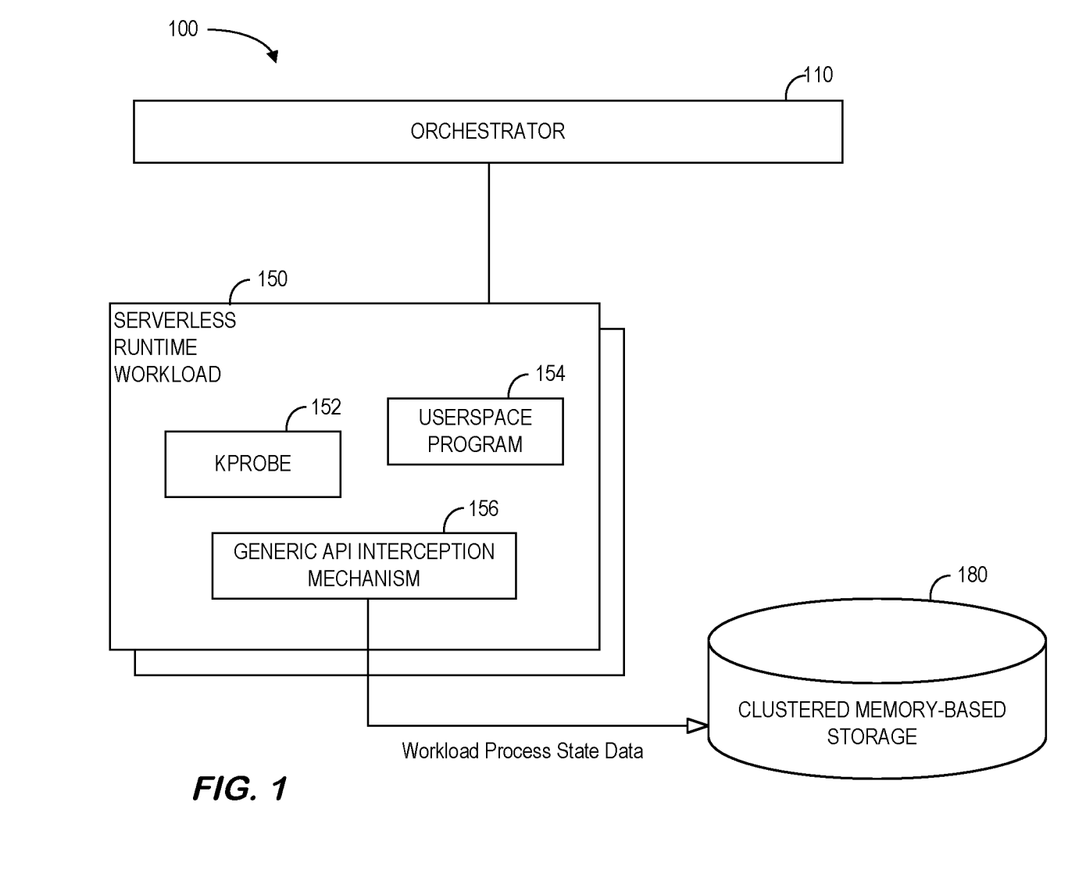
FIG. 1 is a high-level block diagram of a system to store state information in accordance with some embodiments.

FIG. 1 is a high-level block diagram of a system 100 to store state information in accordance with some embodiments. The system 100 includes an orchestrator 110 that manages serverless runtime workloads 150. The workloads 150 may be executed, for example, on virtual machines running a Linux operating system kernel. Moreover, each workload may be associated with a kprobe 152, a userspace program 154, and a generic Application Programming Interface ("API") interception mechanism 156. According to some embodiments, a native Linux feature called eBPF may be utilized as the userspace program 154. The original BPF was designed to capture and filter network packets that matched specific rules. Filters may be implemented as programs to be run on a register-based virtual machine. The introduction of eBPF allowed parameters to be passed to functions in eBPF virtual machine registers, just like on native hardware. An eBPF program is "attached" to a designated code path in the kernel. When the code path is traversed, any attached eBPF programs are executed. Thus, eBPF provides an ability to attach user-provided functions to arbitrary kernel functions. These user-provided functions get called when the flow of the kernel is passed to the function it is attached to.

Using eBPF, from the userspace program 154, the system 100 may attach the kernel probe 152 (also referred to as a "kprobe") to a function. The kprobe 152 may dynamically break into almost any kernel routine and collect debugging and performance information non-disruptively (e.g., associated with a trap at almost any kernel code address and specifying a handler routine to be invoked when the breakpoint is hit). The kprobe 152 can be inserted on virtually any instruction in the kernel, and a return probe fires when a specified function returns. In the typical case, kprobe-based instrumentation is packaged as a kernel module. A module's init function installs ("registers") one or more probes, and an exit function may unregister them. The kprobe 152 is a user provided function which is called from the kernel, in the kernel mode, whenever the function it is attached to is called. Note that a user probe (also referred to as a "uprobe") may perform a similar function.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The workload may automatically store workload process state data into a clustered memory-based storage 180 device and/or exchange information with other various data stores which may be locally stored or reside remote from the workload 150. As used herein, the term "automatically" may refer to, for example, actions that can be performed with little or no human intervention. Although a single workload 150 is shown in FIG. 1, any number of such devices may be included. Moreover, various devices described herein might be combined according to embodiments of the present invention. For example, in some embodiments, the orchestrator 110 and workload 150 might comprise a single apparatus. The system 100 functions may be performed by a constellation of networked apparatuses, such as in a distributed processing or cloud-based architecture.

An administrator or operator may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to adjust mapping and/or other parameter) and/or provide or receive automatically generated recommendations or results from the system 100.

Figure 2:
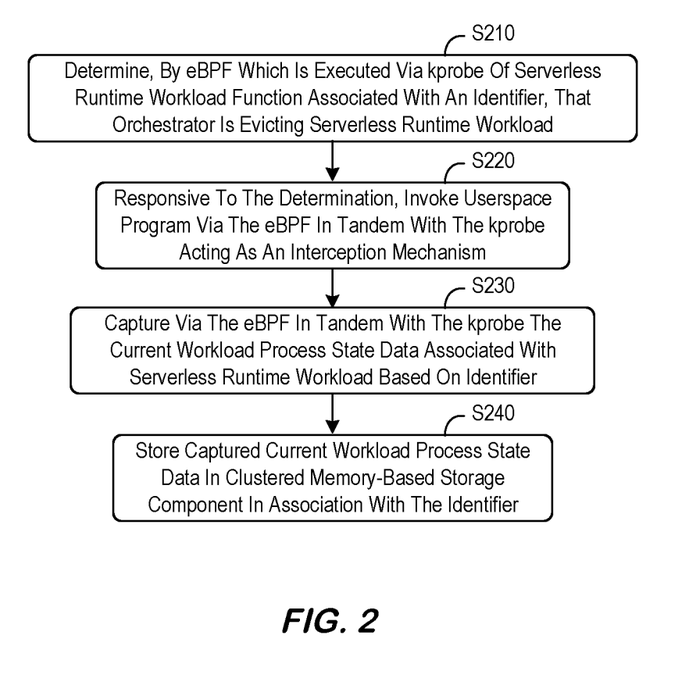
FIG. 2 is a high-level method to store state information according to some embodiments.

FIG. 2 is a method to store state information that might performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, an eBPF, which is executed via a kprobe of a serverless runtime workload function (associated with an identifier), may determine that an orchestrator is evicting a serverless runtime workload. Responsive to the determination, at S220 the system may invoke a userspace program via the eBPF in tandem with the kprobe acting as an interception mechanism. At S230, the system may capture current workload process state data associated with the serverless runtime workload based on the identifier. At S240, the captured current workload process state data may be stored in a clustered memory-based storage component in association with the identifier.

Figure 3:
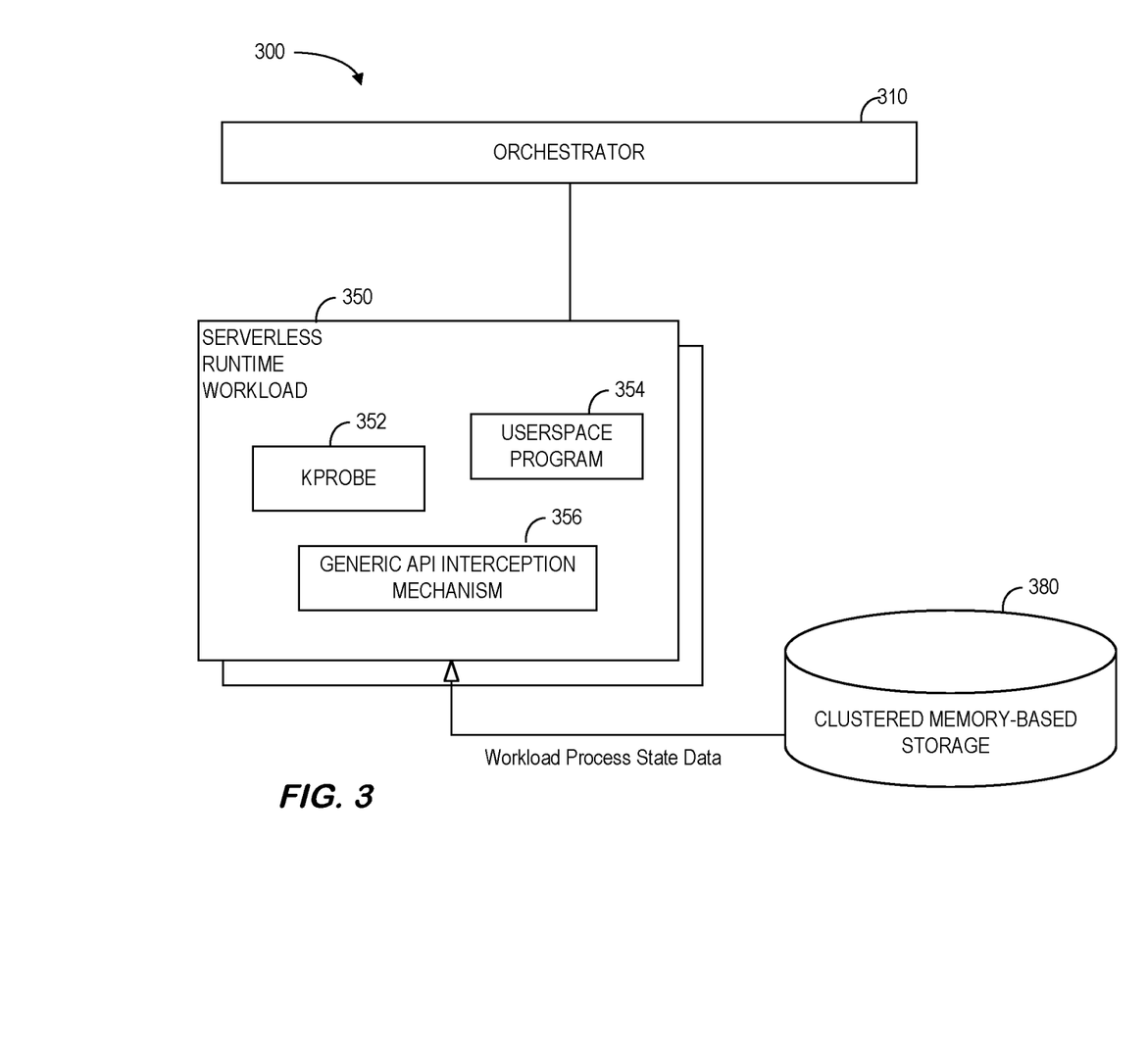
FIG. 3 is a high-level block diagram of a system to restore state information in accordance with some embodiments.

FIG. 3 is a high-level block diagram of a system 300 to restore state information in accordance with some embodiments. As before, the system 300 includes an orchestrator 310 that manages serverless runtime workloads 350. The workloads 350 may be executed, for example, on virtual machines running a Linux operating system kernel. Moreover, each workload may be associated with a kprobe 352, a userspace program 354, and a generic API interception mechanism 356. In this case, workload process state data may be loaded from the clustered memory-based storage 380 into the workload 350.

Figure 4:
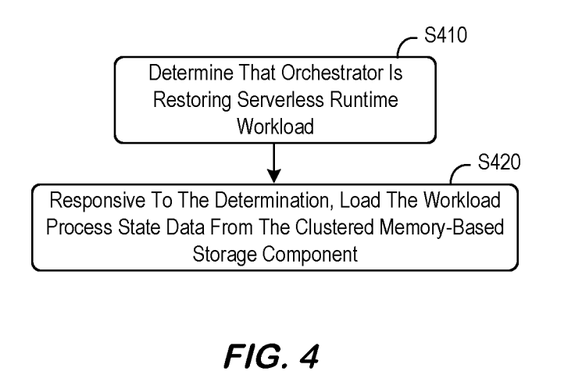
FIG. 4 is a high-level method to restore state information according to some embodiments.

FIG. 4 is a high-level method to restore state information according to some embodiments. In particular, a subsequent serverless runtime workload executing a kernel determines that the orchestrator is restoring the serverless runtime workload at S410. Responsive to the determination, the system may load the workload process state data from the clustered memory-based storage component into the subsequent serverless runtime workload (restoring the previous state of the machine) at S420.

Thus, embodiments may provide a generic and non-intrusive solution to implement stateful serverless functionality. Moreover, embodiments may combine some of the Linux utilities to implement the appropriate pattern. Note that state may be captured at a process level abstraction, which lets embodiments be agnostic of the runtime executing the workload. Also, a generic API interception mechanism may be utilized to intercept process lifecycle hooks.

Figure 5:
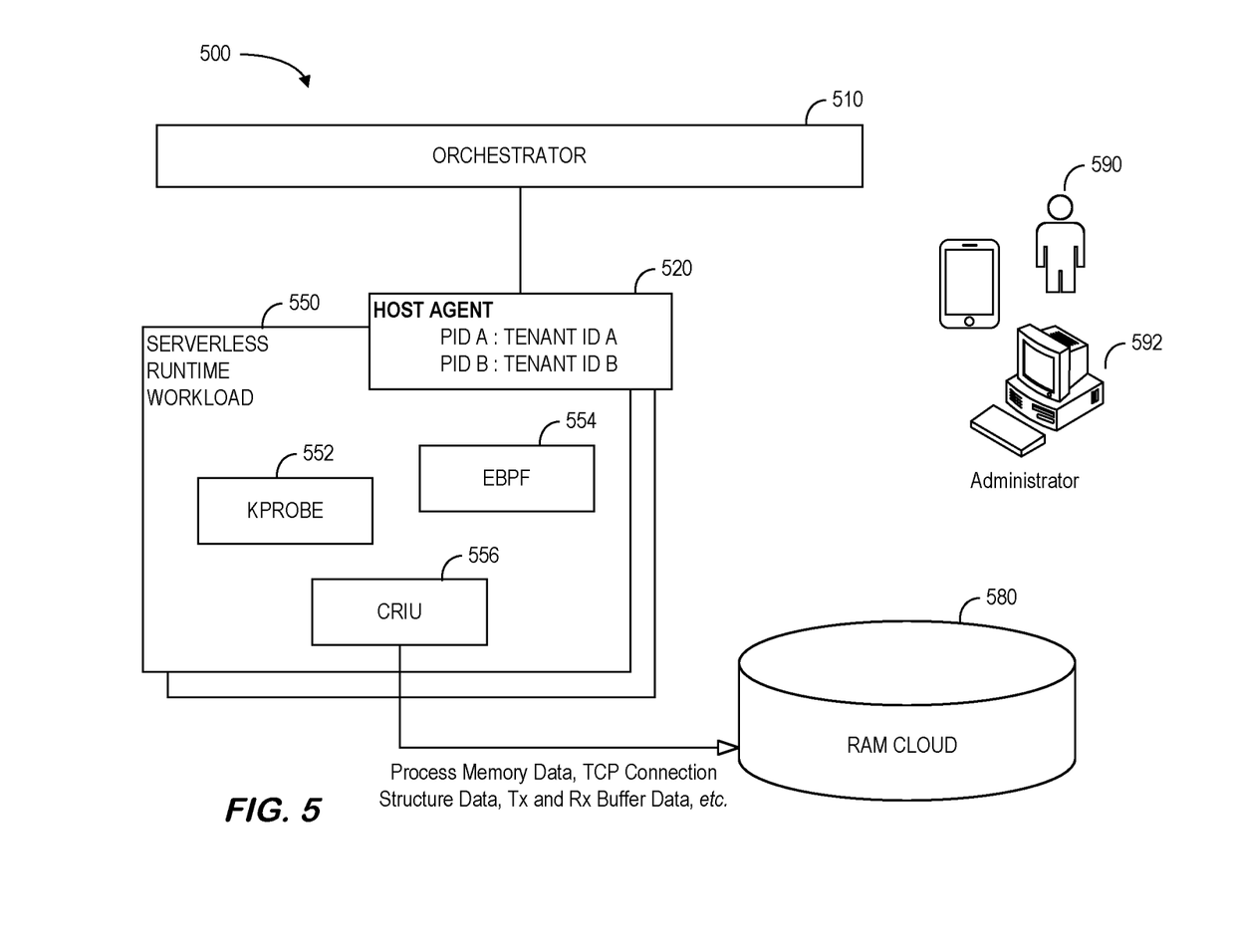
FIG. 5 is a more detailed block diagram of a system to store state information in accordance with some embodiments.

FIG. 5 is a more detailed block diagram of a system 500 to store state information in accordance with some embodiments. The system 500 includes an orchestrator 510 that manages serverless runtime workloads 550 using a host agent 520. The workloads 550 may be executed, for example, on virtual machines running a Linux operating system kernel. Moreover, each workload may be associated with a kprobe 552 and an eBPF program 554. In this embodiment, a Checkpoint/Restore In Userspace ("CRIU") 556 is invoked via the eBPF program 554 in tandem with the kprobe 552 (which acts as an interception mechanism). The CRIU 556 is a Linux software tool that makes it possible to freeze a running application (or part of it) and checkpoint it to persistent storage as a collection of files. One can then use the files to restore and run the application from the point it was frozen at. Note that the CRIU 556 is mainly implemented in user space (rather than in the kernel).

CRIU 556 uses Ptrace internally to hook into an existing Linux process and capture state (e.g., process memory) and, if needed, other kernel structures such as TCP connection structures (Tx/Rx buffers). Since this is a userspace utility, the system 500 needs a way to hook onto this utility when the function is about to be evicted by the orchestrator 510. Note that the orchestrator S150 generally uses the host agent 520 to spin/evict the function. As a result, embodiments may rely on the host agent 520 and a small eBPF program 554 which relies on the kprobe 552 to capture process exit calls.

The host agent 520 may be made aware of the tenant for which the function/process is to be launched/evicted. Once a process is exiting (as an example, embodiments may use a kprobe 552), which is triggered with a process identifier ("pid") and tenant id (mapped by the host agent 520 to the pid) as an input parameter. The kprobe 552 invokes the eBPF program 554 with the pid of the process. The eBPF program 554 in turn triggers a userspace program with the pid. This userspace program is the CRIU 556 launcher which takes the pid as an input and captures the process state. For performance reasons, embodiments may utilize a write back cache with a RAM cloud 580 as the front end backed by persistent disks. The RAM cloud 580 is a setup of servers with replication to allow for the fast persistence and retrieval of data. The CRIU 556 captures the state against the tenant and pushes this state to the RAM cloud 580 where it is stored in connection with the tenant id. According to some embodiments, an administrator 590 may setup or adjust the system 500 via administrator devices 592.

Figure 6:
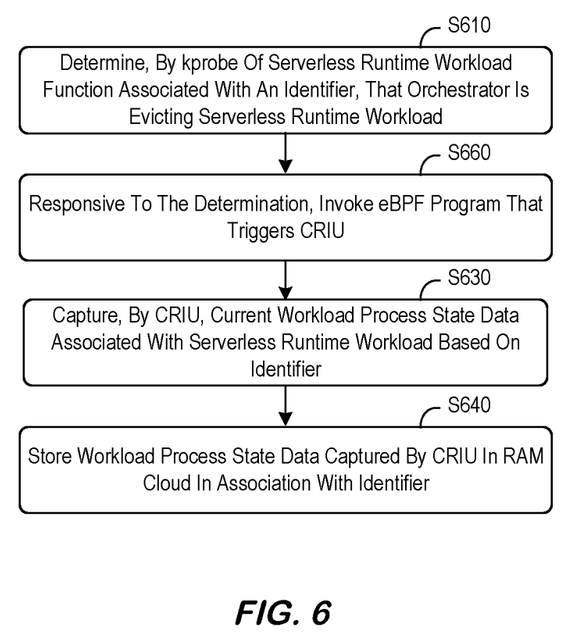
FIG. 6 is a more detailed method to store state information according to some embodiments.

FIG. 6 is a more detailed method to store state information according to some embodiments. At S610, a kprobe of a serverless runtime workload function (associated with a pid and tenant id) may determine that an orchestrator is evicting a serverless runtime workload. Responsive to the determination, at S620 the system may invoke an eBPF program that triggers a CRIU. At S630, the CRIU may capture current workload process state data associated with the serverless runtime workload based on the identifiers. At S640, the workload process state data captured by the CRIU may be stored in a RAM cloud in association with the identifiers.

For state persistence, embodiments may rely on fast and reliable state transfer, such as that enable via clustered memory-based storage backed by disks (in case the memory version of the state is not available for any reason. Embodiments may implement a write back sort of mechanism where the state is first stored in memory and clustered for high availability purposes. The state is also stored on disks via a background thread. As an example of such state persistence, some embodiments use a RAM cloud as one possible alternative.

Figure 7:
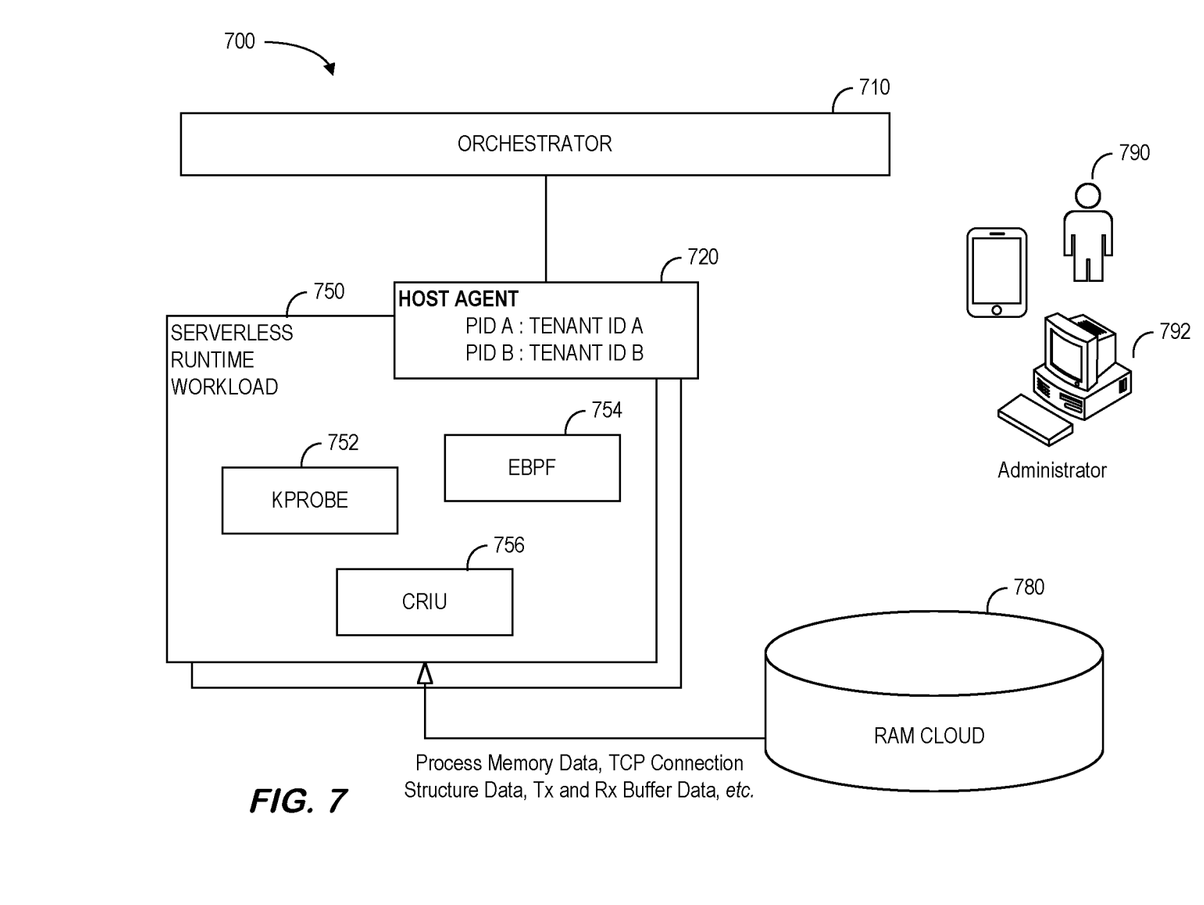
FIG. 7 is a more detailed block diagram of a system to restore state information in accordance with some embodiments.

FIG. 7 is a more detailed block diagram of a system 700 to restore state information in accordance with some embodiments. As before, the system 700 includes an orchestrator 710 that manages serverless runtime workloads 750 using a host agent 720. The workloads 750 may be executed, for example, on virtual machines running a Linux operating system kernel. Moreover, each workload may be associated with a kprobe 752, an eBPF program 754, and CRIU 756. During restoration, the system 700 may call fork/execve and capture information as part of kprobe 752 (or a uprobe). This may in turn trigger the eBPF program 754 to again launch the CRIU 756 which uses the tenant id parameter to retrieve state from the RAM cloud 780 and use the same for restoring the function/process with the desired state. According to some embodiments, an administrator 790 may setup or adjust the system 700 via administrator devices 792.

Figure 8:
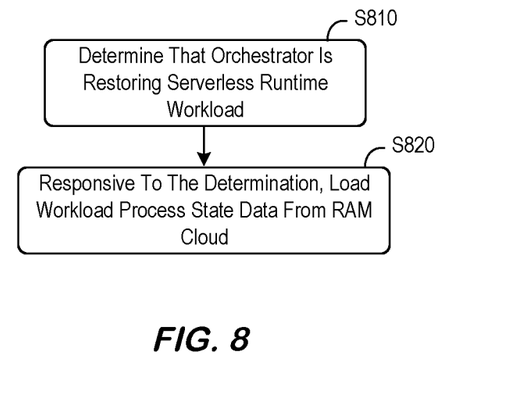
FIG. 8 is a more detailed method to restore state information according to some embodiments.

FIG. 8 is a more detailed method to restore state information according to some embodiments. In particular, a subsequent serverless runtime workload executing a kernel determines that the orchestrator is restoring the serverless runtime workload at S810. Responsive to the determination, the system may load the workload process state data from the RAM cloud into the subsequent serverless runtime workload (restoring the previous state of the machine) at S820.

Thus, embodiments may provide a framework for stateful serverless workloads which can be put to use for variety of systems such as Advanced Business Application Programming ("ABAP") dialogs, cloud platform service brokers, projects like Kyma, cloud foundry applications, etc.

Figure 9:
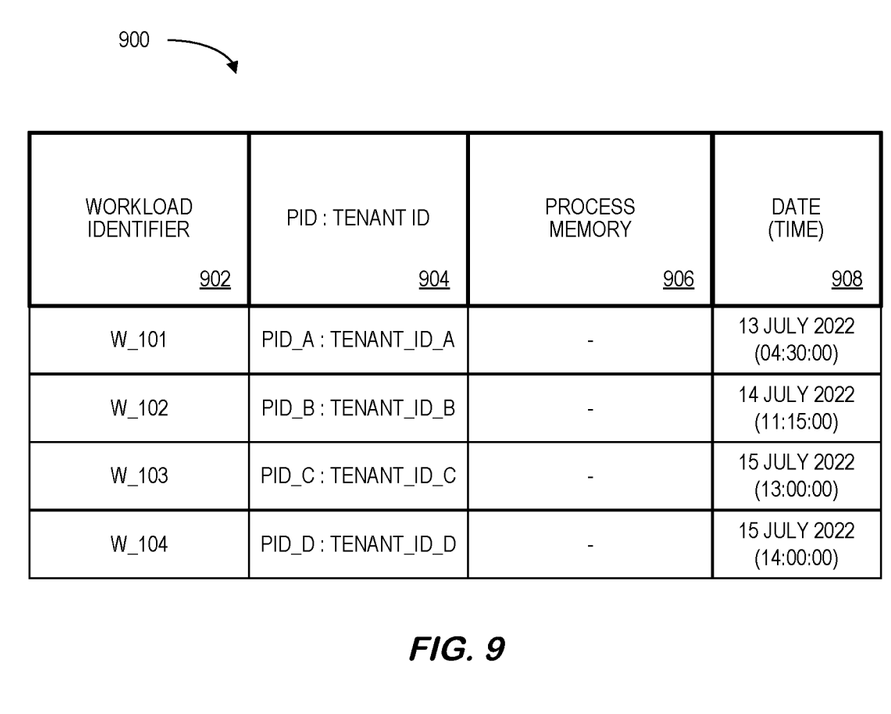
FIG. 9 is a workload database in accordance with some embodiments.

Referring to FIG. 9, a table is shown that represents a workload database 900 that may be stored according to some embodiments. The table may include, for example, entries associated with stateful serverless workloads. The table may also define fields 902, 904, 906, 908, 910 for each of the entries. The fields 902, 904, 906, 908, 910 may, according to some embodiments, specify: a workload identifier 902, a pid and tenant id 904, process memory 906, and a date and time 908. The workload database 900 may be created and updated, for example, as stateful serverless workflows are evicted, restored, etc.

The workload identifier 902 may be, for example, a unique alphanumeric code identifying a serverless runtime workload executing on a virtual machine in a cloud computing environment. The pid and tenant id 904 may be identifiers mapping a process identifier and a tenant identifier (e.g., in a multi-tenant system). The process memory 906 may represent state information that is stored when a workload is evicted. The date and time 908 might indicate when the process memory 906 was captured.

Figure 10:
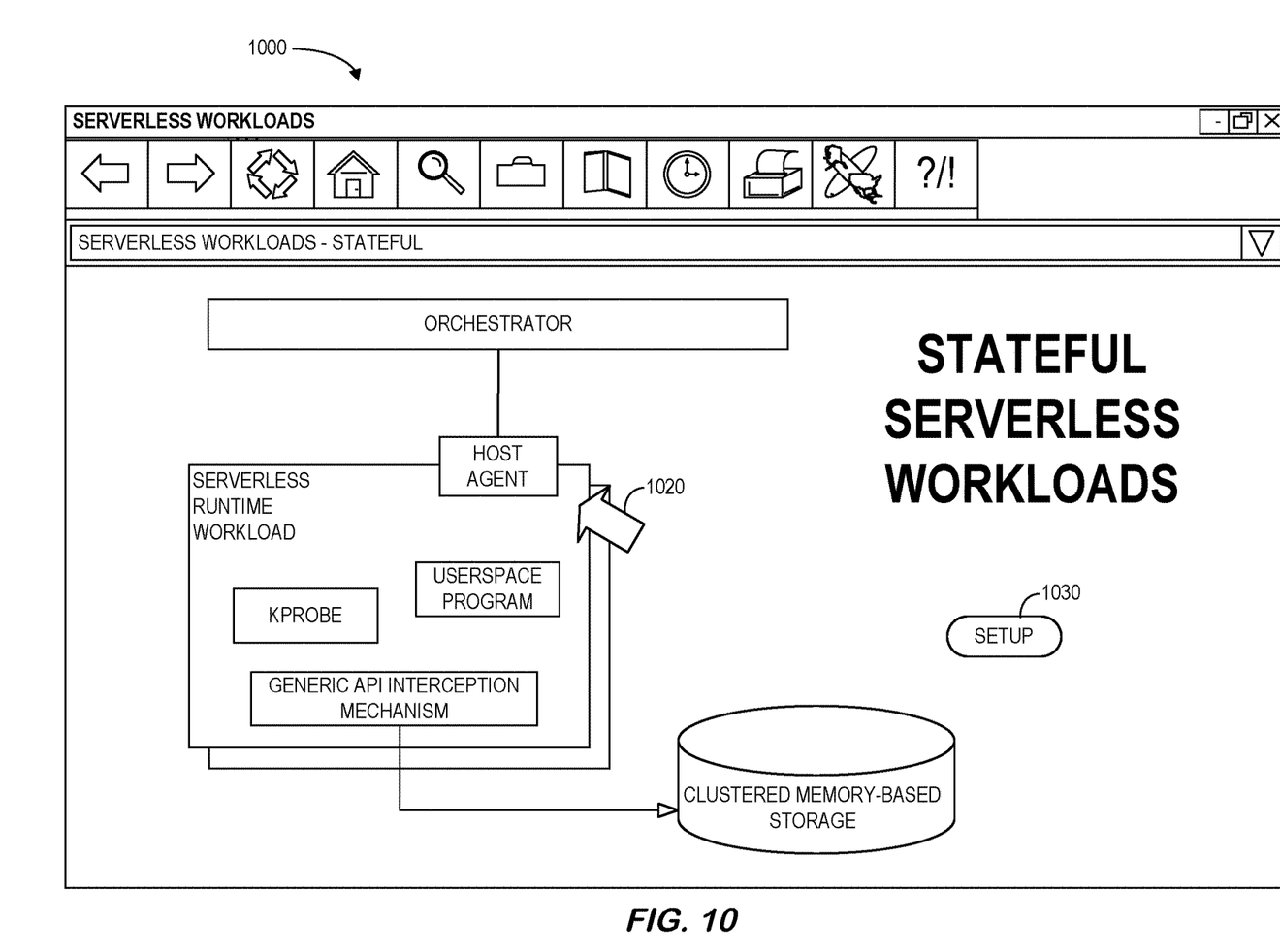
FIG. 10 is a human machine interface display according to some embodiments.

FIG. 10 is a human machine interface display 1000 in accordance with some embodiments. The display 1000 includes a graphical representation 1010 of elements of a stateful serverless workload system for a cloud computing environment (e.g., PaaS, IaaS, etc.). Selection of an element (e.g., via a touch-screen or computer pointer 1020) may result in display of a pop-up window containing various options (e.g., to view more information about an element status, adjust a mapping or other parameter associated with the system, etc.). The display 1000 may also include a user-selectable "Setup" icon 1030 (e.g., to configure elements of the system).

Thus, embodiments may provide for multi-language (that is, programming language agnostic) stateful serverless workloads in a cloud computing environment in an efficient, automatic, and accurate manner.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of disks, databases, and cloud computing environments, any of the embodiments described herein could be applied to other types of storage devices or data center providers.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud computing environment, comprising:
    a computer processor; and
    a computer memory, coupled to the computer processor, storing instructions that, when executed by the computer processor, run a serverless runtime workload executing an extended Berkley Packet Filter ("eBPF") via a kprobe which gets invoked when function code is executed as a Linux process to:
        determine, by the kprobe function associated with an identifier, that an orchestrator is evicting the serverless runtime workload,
        responsive to the determination, invoke a userspace program via the eBPF in tandem with the kprobe acting as an interception mechanism, and
        utilizing the userspace program to capture current workload process state data associated with the serverless runtime workload based on the identifier; and
    a clustered memory-based storage component to:
        store the captured current workload process state data in association with the identifier.

2. The system of claim 1, wherein the cloud computing environment is a multi-tenant cloud computing environment.

3. The system of claim 2, wherein the serverless runtime workload is associated with a tenant, and the identifier is associated with a process identifier ("pid") and tenant identifier ("tenant id") stored at a host agent.

4. The system of claim 1, wherein the cloud computing environment is associated with at least one of: (i) an Infrastructure-as-a-Service ("IaaS") data center, and (ii) a Platform-as-a-Service ("PaaS") data center.

5. The system of claim 1, wherein the userspace program is associated with a Checkpoint Restore In Userspace ("CRIU") tool.

6. The system of claim 1, wherein the workload process state data includes at least one of: (i) process memory data, (ii) kernel structure data, (iii) Transmission Control Protocol ("TCP") connection structure data, (iv) transmission ("Tx") buffer data, and (v) receiver ("Rx") buffer data.

7. The system of claim 1, wherein the clustered memory-based storage component is backed by disks.

8. The system of claim 7, wherein the clustered memory-based storage component is associated with Random Access Memory ("RAM") cloud.

9. The system of claim 1, further comprising:
    a subsequent serverless runtime workload executing a kernel to:
        determine that the orchestrator is restoring the serverless runtime workload, and
        responsive to the determination, load the workload process state data from the clustered memory-based storage component.

10. A computer-implemented method associated with a cloud computing environment, comprising:
    determining, by an extended Berkley Packet Filter ("eBPF") which is executed via a kprobe of a serverless runtime workload function associated with an identifier, that an orchestrator is evicting a serverless runtime workload;
    responsive to the determination, invoking a userspace program via the eBPF in tandem with the kprobe acting as an interception mechanism;
    utilizing the userspace program to capture current workload process state data associated with the serverless runtime workload based on the identifier; and
    storing the captured current workload process state data in a clustered memory-based storage component in association with the identifier.

11. The method of claim 10, wherein the cloud computing environment is a multi-tenant cloud computing environment.

12. The method of claim 11, wherein the serverless runtime workload is associated with a tenant, and the identifier is associated with a process identifier ("pid") and tenant identifier ("tenant id") stored at a host agent.

13. The method of claim 10, wherein the cloud computing environment is associated with at least one of: (i) an Infrastructure-as-a-Service ("IaaS") data center, and (ii) a Platform-as-a-Service ("PaaS") data center.

14. The method of claim 10, wherein the userspace program is a Checkpoint Restore In Userspace ("CRIU") tool.

15. The method of claim 10, wherein the workload process state data includes at least one of: (i) process memory data, (ii) kernel structure data, (iii) Transmission Control Protocol ("TCP") connection structure data, (iv) transmission ("Tx") buffer data, and (v) receiver ("Rx") buffer data.

16. The method of claim 10, wherein the clustered memory-based storage component is backed by disks associated with Random Access Memory ("RAM") cloud.

17. A non-transitory, computer readable medium having executable instructions stored therein, the medium comprising:
    instructions to determine, by an extended Berkley Packet Filter ("eBPF") which is executed via a kprobe of a serverless runtime workload function associated with an identifier, that an orchestrator is evicting a serverless runtime workload;
    instructions to, responsive to the determination, invoke a Checkpoint/Restore In Userspace ("CRIU") userspace program via the eBPF in tandem with the kprobe acting as an interception mechanism;
    instructions to utilize the userspace program to capture, current workload process state data associated with the serverless runtime workload based on the identifier; and
    instructions to store the captured current workload process state data in a clustered memory-based storage component in association with the identifier.

18. The medium of claim 17, wherein the workload process state data includes at least one of: (i) process memory data, (ii) kernel structure data, (iii) Transmission Control Protocol ("TCP") connection structure data, (iv) transmission ("Tx") buffer data, and (v) receiver ("Rx") buffer data.

19. The medium of claim 17, wherein the clustered memory-based storage component is backed by disks.

20. The medium of claim 19, wherein the clustered memory-based storage component is associated with Random Access Memory ("RAM") cloud.

\* \* \* \* \*